United States Patent
Yeo et al.

(10) Patent No.: US 7,479,347 B2
(45) Date of Patent: Jan. 20, 2009

(54) PRISMATIC BATTERY HAVING ELECTROLYTE INJECTION-HOLE CAPABLE OF EXCELLENT SEALING-DISPOSITION

(75) Inventors: Chang-Sin Yeo, Geoje-si (KR); Sung Ryul Kwon, Daejeon (KR); Hyunjin Kim, Daegu (KR); Seung Tae Lee, Gangwon-do (KR); Jin-Woo Jeon, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 11/558,951

(22) Filed: Nov. 13, 2006

(65) Prior Publication Data

US 2007/0264565 A1 Nov. 15, 2007

(30) Foreign Application Priority Data

Dec. 14, 2005 (KR) .................... 10-2005-0122852

(51) Int. Cl.
*H01M 2/08* (2006.01)
*H01M 2/00* (2006.01)
*H01M 2/36* (2006.01)

(52) U.S. Cl. .................... 429/185; 429/163; 429/72; 429/79; 429/89

(58) Field of Classification Search ................ 429/185, 429/163, 72, 79, 89
See application file for complete search history.

(56) References Cited

U.S. PATENT DOCUMENTS

| | | | |
|---|---|---|---|
| 6,761,996 B1 * | 7/2004 | Kim et al. | 429/185 |
| 2004/0121230 A1 * | 6/2004 | Fong et al. | 429/181 |
| 2005/0221176 A1 * | 10/2005 | Kim | 429/175 |

FOREIGN PATENT DOCUMENTS

| | | | |
|---|---|---|---|
| JP | 2002-0358948 | * | 12/2002 |
| JP | 2004-000232 | | 1/2004 |
| JP | 2004-023253 | | 1/2004 |

* cited by examiner

*Primary Examiner*—Patrick Ryan
*Assistant Examiner*—Angela Martin
(74) *Attorney, Agent, or Firm*—Cantor Colburn LLP

(57) ABSTRACT

Disclosed herein is a prismatic battery having an electrode assembly mounted in a prismatic battery case, wherein an electrolyte injection hole formed in a base plate mounted to an open upper end of the battery case is constructed such that an inside upper end of the electrolyte injection hole is formed in a downward taper (incline) structure, and a metal ball is forcibly inserted into the electrolyte injection hole such that the metal ball is plastically deformed to seal the electrolyte injection hole. The prismatic battery according to the present invention provides high coupling force between the metal ball and the electrolyte injection hole due to the plastic deformation and forced insertion of the metal ball and high sealability of the electrolyte injection hole. Also, the formation of a groove at the upper end of the forcibly inserted metal ball and the generation of cracks at the interface between the metal ball and the inside surface of the electrolyte injection hole are effectively prevented. Consequently, the present invention has the effect of accomplishing high electrolyte sealability.

9 Claims, 6 Drawing Sheets

PRISMATIC BATTERY HAVING ELECTROLYTE INJECTION-HOLE CAPABLE OF EXCELLENT SEALING-DISPOSITION

FIELD OF THE INVENTION

The present invention relates to a prismatic battery having a highly sealable electrolyte injection hole, and, more particularly, to a prismatic battery having an electrode assembly mounted in a prismatic battery case, wherein an electrolyte injection hole formed in a base plate mounted to an open upper end of the battery case is constructed such that an inside upper end of the electrolyte injection hole is formed in a downward taper structure, whereby, when a metal ball is forcibly inserted into the electrolyte injection hole so as to plastically deform the metal ball, the formation of a groove at the upper end of the forcibly inserted metal ball and the generation of cracks at the interface between the metal ball and the inside surface of the electrolyte injection hole are effectively prevented, and therefore, high electrolyte sealability is accomplished.

BACKGROUND OF THE INVENTION

As mobile devices have been increasingly developed, and the demand of such mobile devices has increased, the demand of secondary batteries has been also sharply increased as an energy source for the mobile devices. Based on their external and internal structures, the secondary batteries are generally classified into a cylindrical battery, a prismatic battery, and a pouch-shaped battery. As the mobile devices have been miniaturized, the prismatic battery and the pouch-shaped battery, which have a small width to length ratio, have attracted considerable attention recently.

The prismatic secondary battery is manufactured by placing an electrode assembly including cathodes, anodes, and separators in a prismatic battery case, mounting a base plate to the upper end of the battery case, for example, by welding, injecting electrolyte into the battery case through an electrolyte injection hole formed in the base plate, sealing the electrolyte injection hole with a metal ball, mounting a safety element and a protection circuit to the base plate, and sealing the battery case with a housing (an external case).

FIG. 1 is a plan view illustrating a base plate mounted to the upper end of a battery case of a conventional prismatic secondary battery with a vertical sectional view taken along line A-A.

Referring to FIG. 1, the base plate 100 is provided at the middle thereof with an electrode terminal 101, which is connected to an electrode tap (for example, an anode tap) of an electrode assembly. The base plate 100 is provided at one side thereof with an electrolyte injection hole 102 for allowing electrolyte to be injected therethrough. Between the electrode terminal 101 and the base plate 100 is disposed an insulating member 103 for electrically isolating the electrode terminal 101 from the base plate 200, which is connected to the other electrode tap (for example, a cathode tap) of the electrode assembly so as to serve as an electrode terminal.

The electrolyte injection hole 102, through which the electrolyte is injected, is formed generally into a vertical sectional shape of a rectangle, as shown in FIG. 2. The electrolyte injection hole 102 is sealed with a metal ball 104, for example, an aluminum ball, having a diameter slightly greater than that of the electrolyte injection hole 102. Specifically, the metal ball 104 is located on the electrolyte injection hole 102, and then the metal ball 104 is pressed from above such that the metal ball 104 is plastically deformed to seal the electrolyte injection hole 102. Subsequently, a thin metal plate is securely fixed to the base plate 100 by laser welding, whereby the electrolyte injection hole 102 is completely sealed.

When the metal ball is plastically deformed and is inserted into the electrolyte injection hole, which is formed in the vertical sectional shape of a rectangle, however, the lower circumferential part of the metal ball is pushed outward by the inside upper end of the electrolyte injection hole. As a result, a groove is formed on the metal ball. The formed groove badly affects the sealing of the electrolyte injection hole by laser welding. Furthermore, inside cracks are continuously generated along the interface between the metal ball and the inside surface of the electrolyte injection hole due to formation of the groove, and therefore, the sealability of the electrolyte injection hole is lowered.

In order to solve the above-mentioned problems, Japanese Unexamined Patent Publication No. 2004-0023253 and Japanese Unexamined Patent Publication No. 2002-358948 disclose a method of forming the inside upper end of the electrolyte injection hole in a taper structure and inserting a sealing member having a shape corresponding to the electrolyte injection hole, instead of the metal ball, into the electrolyte injection hole so as to seal the electrolyte injection hole. This sealing structure has an effect of preventing the generation of the above-mentioned groove. However, as compared with the case that the sealing member (for example, the metal ball) is plastically deformed to seal the electrolyte injection hole, this sealing structure has problems in that the coupling force between the electrolyte injection hole and the sealing member is small, and therefore, the sealability of the electrolyte injection hole is low. For this reason, additional operations must be further carried out so as to complement the small coupling force, which is troublesome.

Consequently, the necessity of a technology to fundamentally solve the above-mentioned problems is highly increased.

SUMMARY OF THE INVENTION

Therefore, the present invention has been made to solve the above-mentioned problems, and other technical problems that have yet to be resolved.

As a result of a variety of extensive and intensive studies and experiments to solve the problems as described above, the inventors of the present application have discovered that, when an electrolyte injection hole formed in a base plate mounted to the upper end of a battery case is constructed such that the inside upper end of the electrolyte injection hole is formed in a downward taper structure, and a metal ball is forcibly inserted into the electrolyte injection hole so as to plastically deform the metal ball such that the electrolyte injection hole is sealed by the metal ball, the sealability of the electrolyte injection hole is improved due to a high coupling force between the electrolyte injection hole and the plastically deformed metal ball, the formation of a groove, which is caused when the metal ball is plastically deformed according to the conventional art, is effectively prevented, the continuous generation of cracks at the interface between the metal ball and the inside surface of the electrolyte injection hole due to the groove is also effectively prevented, and high electrolyte sealability is accomplished. The present invention has been completed based on the above-mentioned discovery.

In accordance with the present invention, the above and other objects can be accomplished by the provision of a prismatic battery having an electrode assembly mounted in a prismatic battery case, wherein an electrolyte injection hole is formed in a base plate mounted to an open upper end of the battery case, the electrolyte injection hole having an inside upper end constructed in a downward taper (incline) structure, and a metal ball is forcibly inserted into the electrolyte injection hole such that the metal ball is plastically deformed to seal the electrolyte injection hole.

According to the present invention, the inside upper end of the electrolyte injection hole is constructed in the above-described incline structure. Consequently, when the metal ball is forcibly inserted into the electrolyte injection hole (the metal ball is pressed such that the metal ball is inserted into the electrolyte injection hole), the plastic deformation of the metal ball is easily achieved. As a result, the formation of a groove at the upper end of the forcibly inserted metal ball is effectively prevented, the generation of cracks at the interface between the metal ball and the inside surface of the electrolyte injection hole is also effectively prevented, and high electrolyte sealability is accomplished.

The incline structure of the electrolyte injection hole is inclined downward at an angle of, preferably, 20 to 70 degrees, and more preferably, 30 to 60 degrees, from the upper end surface of electrolyte injection hole. When an angle of inclination is too large, it is difficult to prevent the formation of the groove and cracks at the plastically deformed metal ball. When an angle of inclination is too small, on the other hand, it is not possible to provide a high coupling force through the plastic deformation.

Also preferably, the incline structure has a width corresponding to 5 to 30% of and a depth corresponding to 10 to 25% of the size (the radius) of the metal ball inserted into the electrolyte injection hole. Here, the width means a length from the point where the upper end surface of the electrolyte injection hole intersects the inside surface of the electrolyte injection hole to the point where the incline starts. The depth means a length from the point where the inside surface of the electrolyte injection hole intersects the upper end surface of the electrolyte injection hole to the point where the incline ends. Like the previous description, when the width and the depth of the incline structure are too small, it is difficult to prevent the formation of the groove and cracks at the plastically deformed metal ball. When the width and the depth of the incline structure are too large, on the other hand, it is not possible to provide a high coupling force through the plastic deformation.

Consequently, the angle of inclination, the width, and the depth of the incline structure are appropriately decided depending upon the sizes of the electrolyte injection hole and the metal ball. In the following embodiments, the incline structure will be described in the terms of an "upper-end inner diameter" and a "lower-end inner diameter" instead of the width for the sake of convenience. Here, the upper-end inner diameter means the diameter of the electrolyte injection hole at the point where the incline starts, and the lower-end inner diameter means the diameter of the electrolyte injection hole at the position where the incline structure is not formed.

The base plate seals the open upper end of the battery case. In addition, the base plate is connected to an electrode tap (for example, an anode tap) of the electrode assembly mounted in the battery case so as to serve as an electrode terminal. Consequently, the base plate is not particularly restricted so long as the base plate is made of an electrically conductive material. Preferably, the base plate is made of aluminum.

The sealing of the electrolyte injection hole may be accomplished, for example, by forcibly inserting the metal ball into the electrolyte injection hole while locating the metal ball on the taper structure of the electrolyte injection hole, and welding the forcibly inserted region using a laser welding method.

In this case, the pressure applied to the metal ball is decided by the width, the depth, and the angle of inclination of the incline structure. Preferably, a pressure of 0.2 to 0.5 MPa is applied to the metal ball. Furthermore, the forcibly inserted ball and the electrolyte periphery are covered with epoxy resin, after the laser welding is completed, so as to protect the forcibly inserted ball and the electrolyte periphery.

The metal ball is not particularly restricted so long as the metal ball can be plastically deformed, when the metal ball is forcibly inserted into the electrolyte injection hole, so as to seal the electrolyte injection hole. Preferably, the metal ball is made of the same material as the base plate. For example, the metal ball may be made of aluminum.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 1:
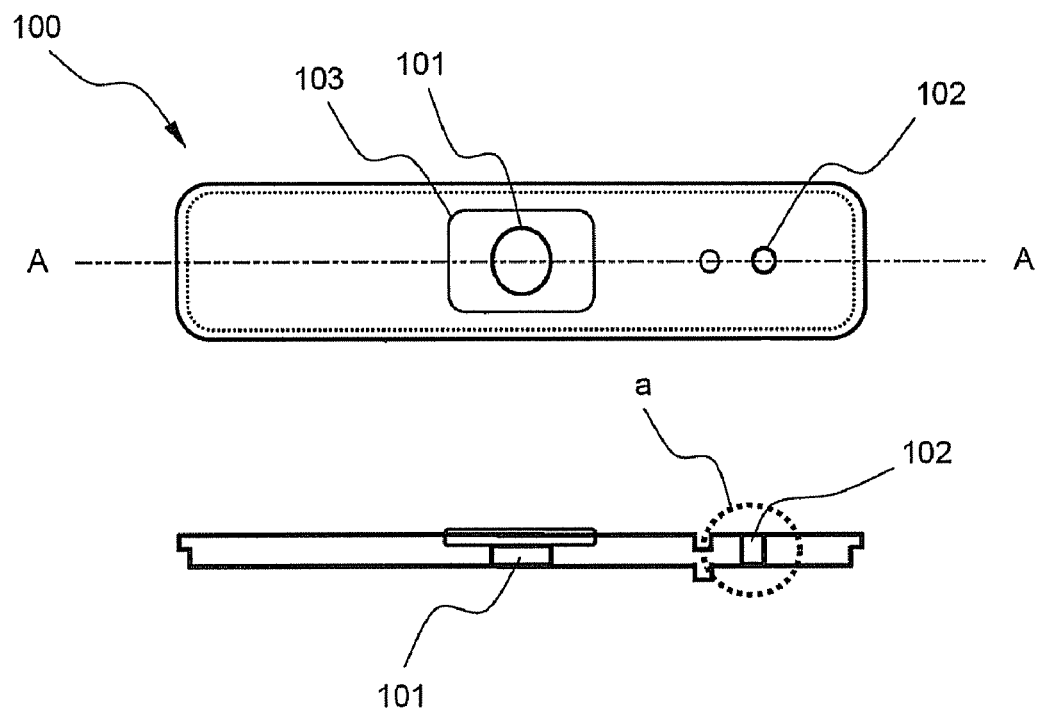
FIG. 1 is a plan view illustrating a base plate, having an electrolyte injection hole formed therein, of a conventional prismatic secondary battery with a vertical sectional view taken along line A-A.
Figure 2:
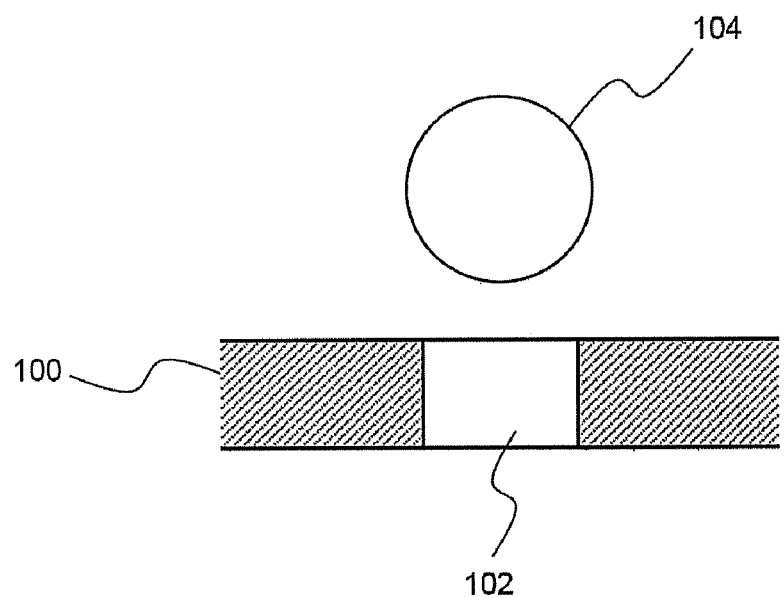
FIG. 2 is an enlarged view of a dotted-line circle "a" in FIG. 1.
Figure 3:
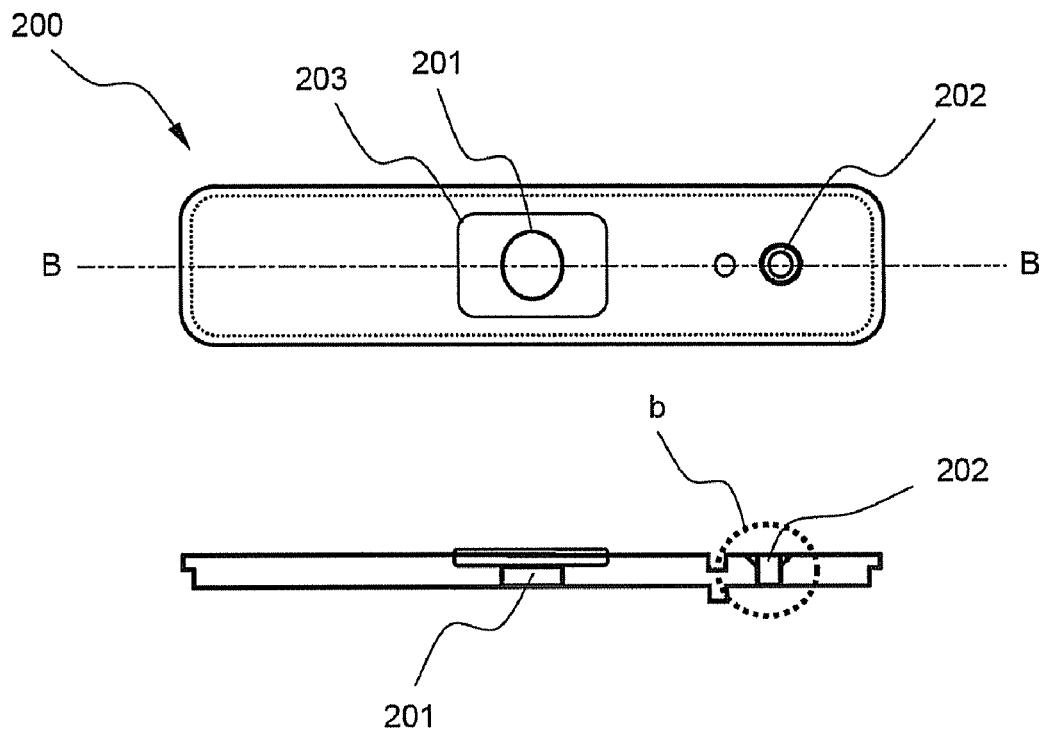
FIG. 3 is a plan view illustrating a base plate, having an electrolyte injection hole formed therein, of a prismatic secondary battery according to a preferred embodiment of the present invention with a vertical sectional view taken along line B-B.

FIG. 3 is a plan view illustrating a base plate, having an electrolyte injection hole formed therein, of a prismatic secondary battery according to a preferred embodiment of the present invention with a vertical sectional view taken along line B-B.

Referring to FIG. 3, the base plate 200 is provided at the middle thereof with an electrode terminal 201, which is connected to an anode tap of an electrode assembly (not shown). The base plate 200 is provided at one side thereof with an electrolyte injection hole 202. At a predetermined position of the upper surface of the base plate 200 adjacent to the electrolyte injection hole 202 is formed a groove, by which a protection circuit module is stably mounted to the base plate 200. Between the electrode terminal 201 and the base plate 200 is disposed an insulating member 203, which electrically isolates the electrode terminal 201 from the base plate 200, which is connected to a cathode tap of the electrode assembly.

Hereinafter, an incline structure of the electrolyte injection hole will be described in detail with reference to FIG. 4, which is an enlarged view of a dotted-line circle "b" in FIG. 3.

Figure 4:
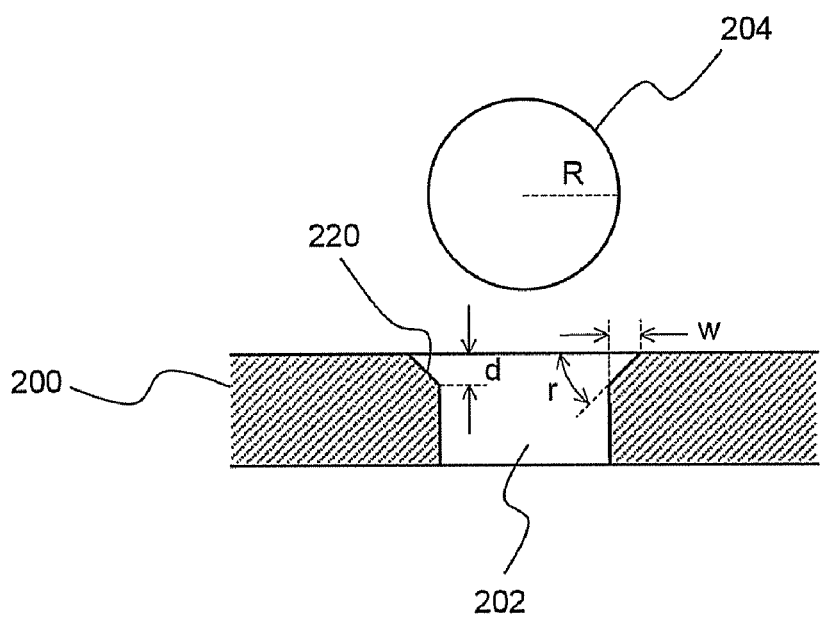
FIG. 4 is an enlarged view of a dotted-line circle "b" in FIG. 3.

Referring to FIG. 4, the inside upper end of the electrolyte injection hole 202 is constructed in a downward taper (incline) structure 220 when viewing the vertical section of the electrolyte injection hole 202. A metal ball 204 having a radius R greater than that of the electrolyte injection hole 202 is forcibly inserted into the electrolyte injection hole 202 such that the electrolyte injection hole 202 can be sealed by the metal ball 204. The incline structure 220 of the electrolyte injection hole 202 is defined by a width w, which means a length from the point where the upper end surface of the electrolyte injection hole 202 intersects the inside surface of the electrolyte injection hole 202 to the point where the incline starts, a depth d, which means a length from the point where the inside surface of the electrolyte injection hole 202 intersects the upper end surface of the electrolyte injection hole 202 to the point where the incline ends, and an angle of inclination r between the upper end surface of the electrolyte injection hole 202 and the incline. Desirable dimensions of the incline structure 220 have been previously described.

After electrolyte is injected into a battery case, the battery case is sealed as follows. First, the metal ball 204 is located on the upper end of the electrolyte injection hole 202, and the metal ball 204 is pressed. At this time, the metal ball is stably located on the upper end of the electrolyte injection hole 202 due to the wide upper end width of the incline structure 220. Also, when the metal ball 204 is plastically deformed during the forced insertion of the metal ball, the vertically upward deformation of the metal ball 204 at the lower circumferential part thereof is minimized because the incline 204 is formed at the inside upper end of the electrolyte injection hole 202. The minimization of such deformation of the metal ball 204 prevents a groove from being formed at the upper end of the forcibly inserted metal ball 204 and effectively prevents the generation of cracks in the metal ball 204. Furthermore, it is easy to forcibly insert the metal ball 204 into the electrolyte injection hole 202. Consequently, it is not necessary to apply an excessive force to the metal ball 204, and therefore, the damage to the base plate 200 is minimized.

Hereinafter, examples of the present invention will be described in detail. It should be noted, however, that the examples are given only for illustrating the present invention, and therefore, the scope of the present invention is not limited by the illustrated examples.

EXAMPLE 1

An electrolyte injection hole having an inner diameter (a lower-end inner diameter) of 1.2 mm was formed, by drilling, in an aluminum base plate having a thickness of 0.8 mm. An incline structure having an inner diameter (an upper-end inner diameter) and an angle of inclination of approximately 45 degrees was formed at the inside upper end of the base plate by forging. The base plate was fixed to the upper end of an aluminum prismatic battery case by laser welding.

Subsequently, a predetermined amount of electrolyte was injected into the battery case through the electrolyte injection hole. An aluminum ball having a diameter of 1.37 mm was located on the electrolyte injection hole, and the aluminum ball was forcibly inserted into the electrolyte injection hole with a pressure of 0.4 MPa so as to seal the electrolyte injection hole.

Comparative Example 1

Except that the incline structure was not formed at the inside upper end of the electrolyte injection hole, the same process as Example 1 was carried out.

Comparative Example 2

Except that an aluminum rivet, instead of the aluminum ball, was used as a sealing member for sealing the electrolyte injection hole, the same process as Example 1 was carried out. The aluminum rivet was constructed such that the upper end diameter of the aluminum rivet is greater than the lower end diameter of the aluminum rivet, and therefore, the aluminum rivet is plastically deformed during the forced insertion of the aluminum rivet.

Experimental Example 1

Figure 5:
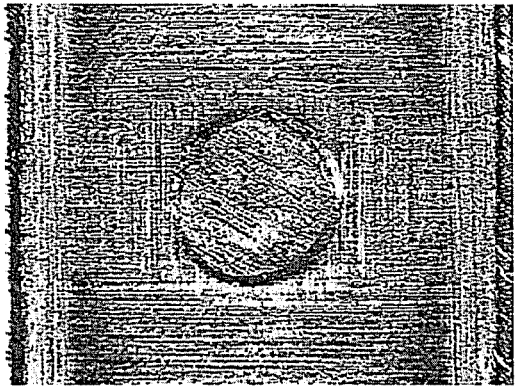
FIG. 5 is a photograph illustrating the plan shape of the electrolyte injection hole shown in FIG. 3 after an aluminum ball is inserted into the electrolyte injection hole and the aluminum ball is rolled (Example 1)
Figure 6:
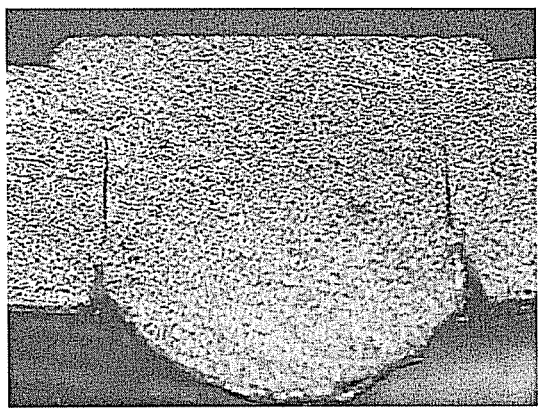
FIG. 6 is a photograph illustrating the sectional shape of the electrolyte injection hole shown in FIG. 5.
Figure 7:
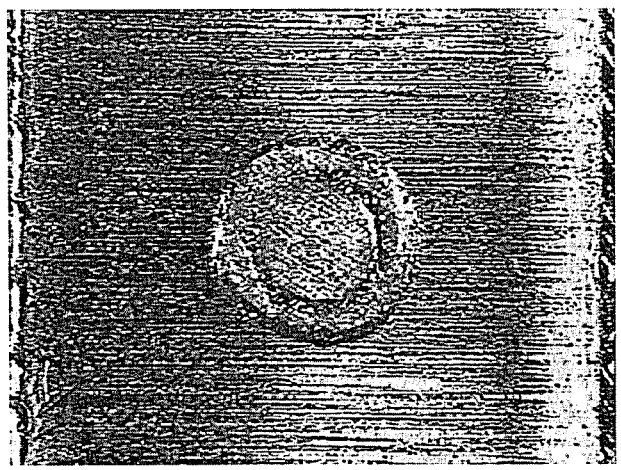
FIG. 7 is a photograph illustrating the plan shape of the electrolyte injection hole shown in FIG. 1 after a metal ball is inserted into the electrolyte injection hole and the metal ball is rolled (Comparative Example 1)
Figure 8:
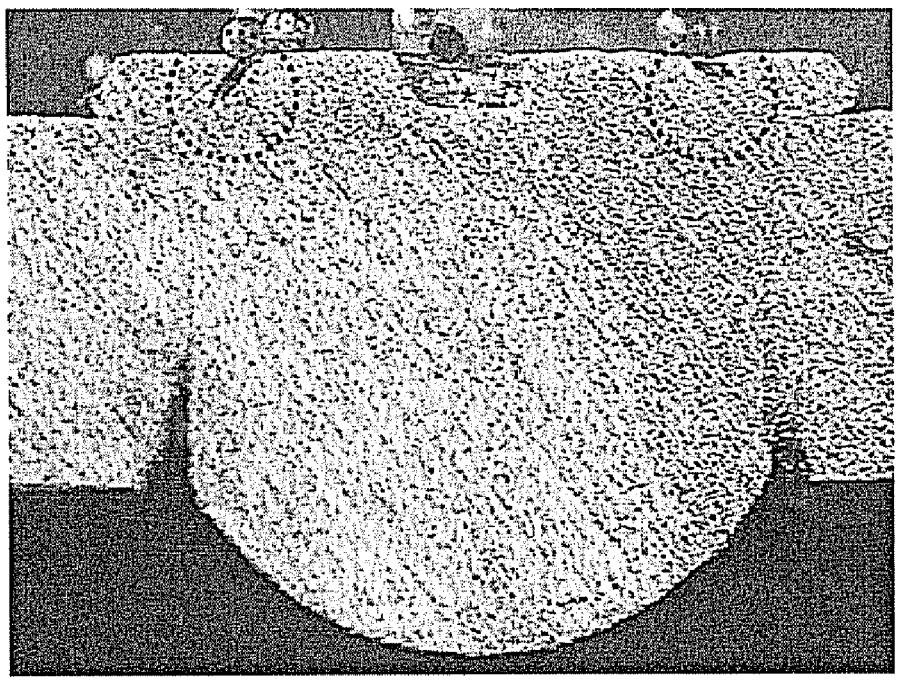
FIG. 8 is a photograph illustrating the sectional shape of the electrolyte injection hole shown in FIG. 7.
Figure 9:
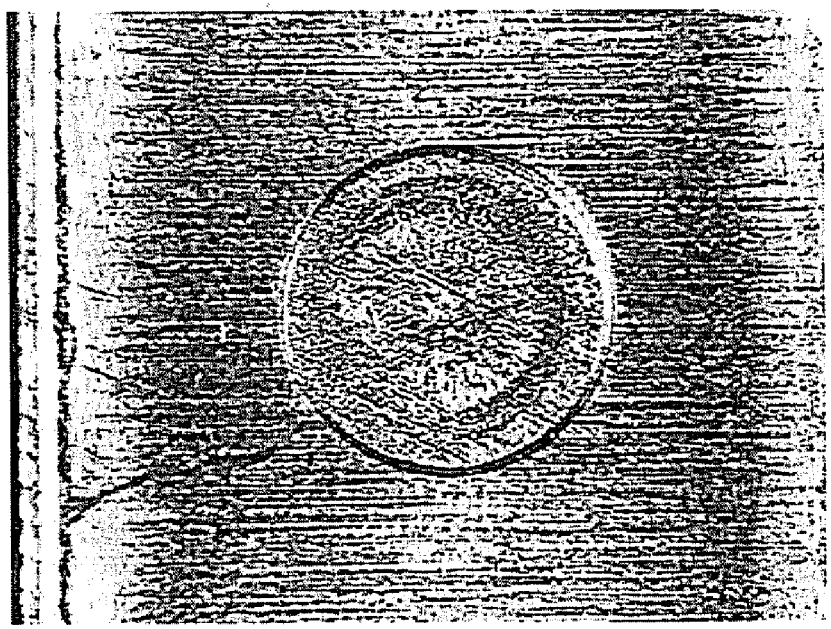
FIG. 9 is a photograph illustrating the plan shape of the electrolyte injection hole shown in FIG. 3 after an aluminum rivet is inserted into the electrolyte injection hole and the aluminum rivet is rolled (Comparative Example 2)
Figure 10:
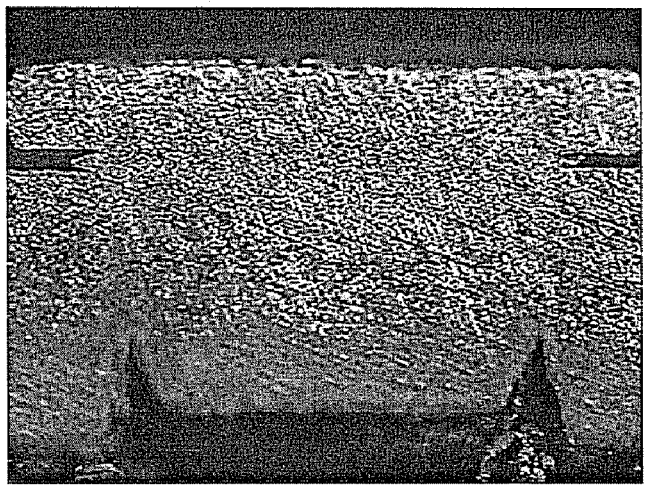
FIG. 10 is a photograph illustrating the sectional shape of the electrolyte injection hole shown in FIG. 9.

FIGS. 5 and 6 are photographs respectively illustrating the plan shape and the sectional shape of the electrolyte injection hole according to Example 1. FIGS. 7 and 8 are photographs respectively illustrating the plan shape and the sectional shape of the electrolyte injection hole according to Comparative Example 1. FIGS. 9 and 10 are photographs respectively illustrating the plan shape and the sectional shape of the electrolyte injection hole according to Comparative Example 2.

It can be seen from the photographs of the electrolyte injection hole according to Comparative Example 1 that, when the aluminum ball was forcibly inserted into the electrolyte injection hole, a portion of the aluminum ball was plastically deformed and pushed upward along the inside surface of the electrolyte injection hole, and, as a result, a groove corresponding to the shape of the electrolyte injection hole was formed at the upper end of the forcibly inserted ball. It can be also seen that cracks were formed at the interface between the inside surface of the electrolyte injection hole and the aluminum ball during the plastic deformation of the aluminum ball.

On the other hand, it can be seen from the photographs of the electrolyte injection hole according to Example 1 that, few grooves and cracks were formed.

Figure 11:
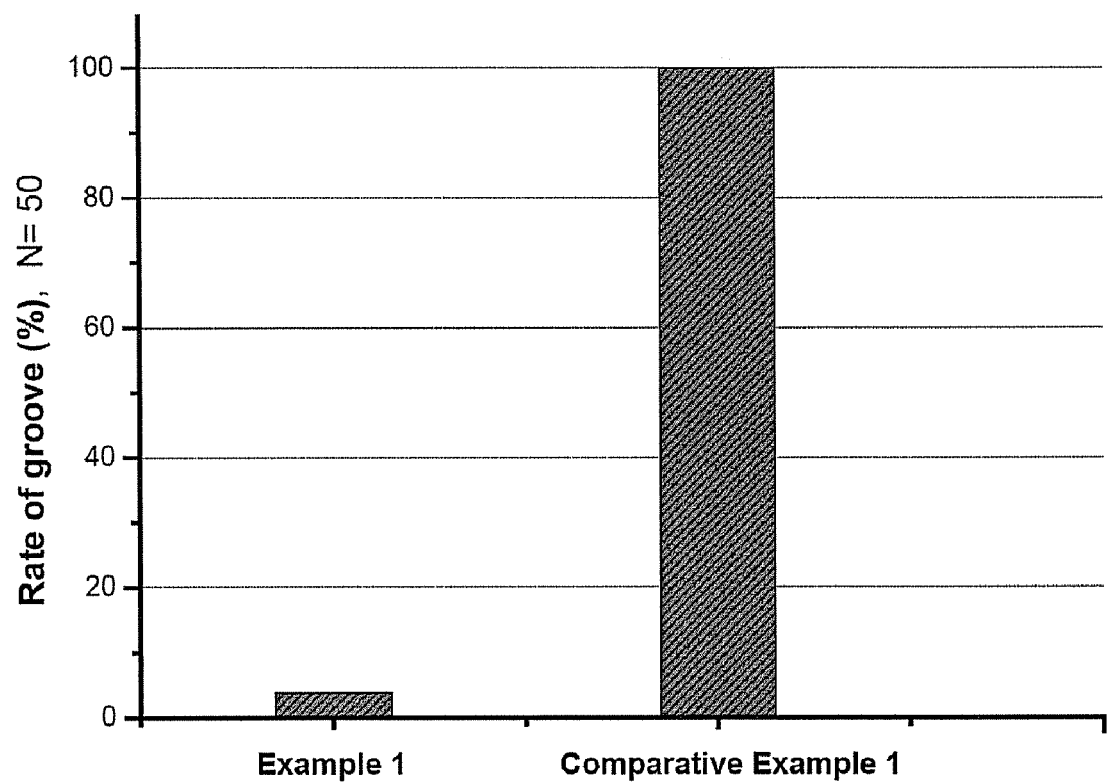
FIG. 11 is a graph illustrating the comparison between the rate of groove formation observed at the electrolyte injection hole according to Comparative Example 1 and the rate of groove formation observed at the electrolyte injection hole according to Example 1.

These results can be certainly confirmed from a graph of FIG. 11, which illustrates the rate of groove formation observed, by precision measurement through microscope observation, at the electrolyte injection hole according to Example 1, as a relative value, when it is assumed that the rate of groove formation observed at the electrolyte injection hole according to Comparative Example 1 is 100.

In the electrolyte injection hole according to Comparative Example 2, on the other hand, no groove was formed at the upper end surface of the electrolyte injection hole. However, it was confirmed that the interface coupling force between the aluminum ball and the inside surface of the electrolyte injection hole is small. This can be seen from Experimental Example 2 below.

Experimental Example 2

Pressures of electrolyte, when the electrolyte starts to leak, were measured so as to confirm a possibility that the electrolyte leaks through the respective electrolyte injection holes sealed according to Example 1 and Comparative Examples 1 and 2. The measurement results are shown in a graph of FIG. 12.

Figure 12:
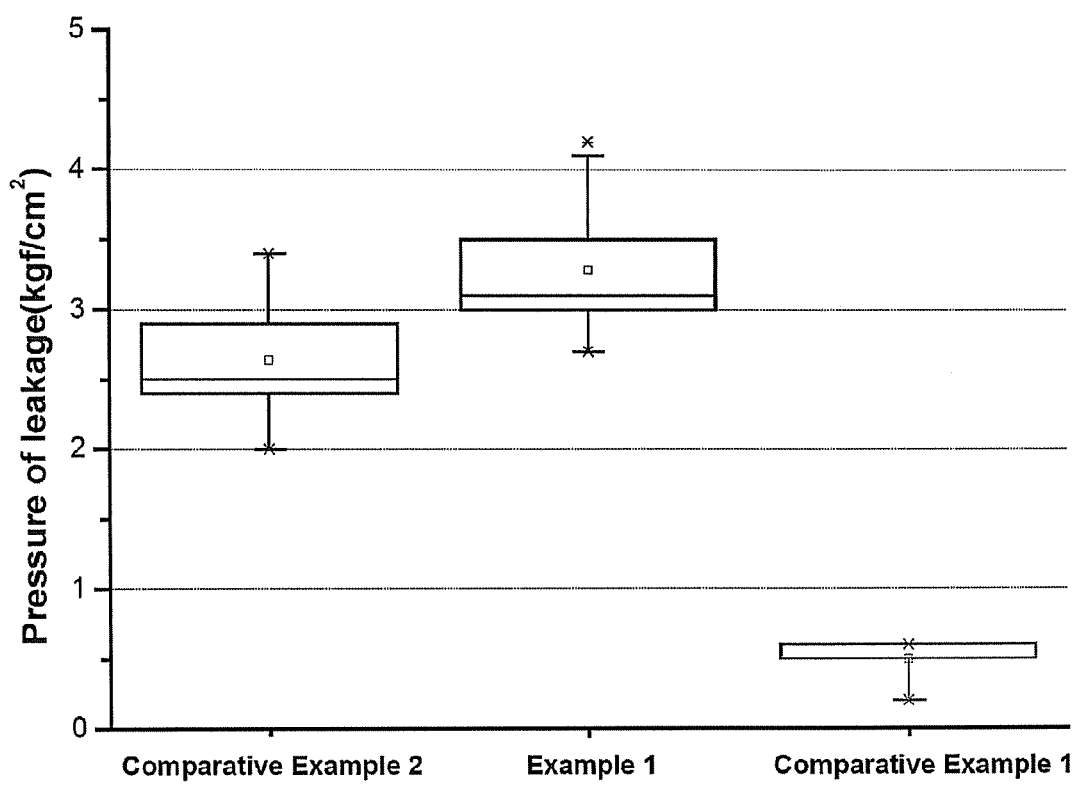
FIG. 12 is a graph illustrating pressures of electrolyte when the electrolyte starts to leak, which have been measured so as to confirm a possibility that the electrolyte leaks through the respective electrolyte injection holes sealed according to Example 1 and Comparative Examples 1 and 2.

As can be seen from FIG. 12, a fairly large pressure is necessary for the electrolyte to leak through the electrolyte injection hole sealed according to Example 1. On the other hand, it can be seen that the electrolyte easily leaks through the electrolyte injection hole sealed according to Comparative Example 1 even when a very small pressure is applied to the electrolyte injection hole.

Also, it can be seen that the electrolyte injection hole sealed according to Comparative Example 2, in which the inside upper end of the electrolyte injection hole was constructed in the incline structure and the aluminum rivet was used as the sealing member, has a sealing force greater than that of the electrolyte injection hole sealed according to Comparative Example 1; however, the sealing force of the electrolyte injection hole sealed according to Comparative Example 2 is lower than that of the electrolyte injection hole sealed according to Example 1. This is because the aluminum rivet of Comparative Example 2 is plastically deformed to a degree corresponding to the forcible insertion (tight fitting) of the aluminum ball of Example 1, and therefore, the sealing is not accomplished. It was confirmed that the survival phenomenon of electrolyte occurs due to the relatively small sealing force, and this phenomenon badly affects an additional laser welding operation after the sealing.

INDUSTRIAL APPLICABILITY

As apparent from the above description, the prismatic battery according to the present invention provides high coupling force between the metal ball and the electrolyte injection hole due to the plastic deformation and forced insertion of the metal ball and high sealability of the electrolyte injection hole. Also, the formation of a groove at the upper end of the forcibly inserted metal ball and the generation of cracks at the interface between the metal ball and the inside surface of the electrolyte injection hole are effectively prevented. Consequently, the present invention has the effect of accomplishing high electrolyte sealability.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A prismatic battery having an electrode assembly mounted in a prismatic battery case, the prismatic battery comprising:

a base plate mounted to an open upper end of the prismatic battery case, the base plate including an electrolyte injection hole having an inside upper end configured to have a downward taper incline structure; and a metal ball disposed within the electrolyte injection hole such that the metal ball is plastically deformed and seals the electrolyte injection hole, wherein the downward taper incline structure has a width corresponding to 5% to 30% and a depth corresponding to 10% to 25% of a radius of the metal ball prior to plastic deformation thereof, and the downward taper incline structure is inclined downward at an angle of 20 to 70 degrees from a surface defining the upper end of the base plate, and wherein an epoxy resin is disposed on the plastically deformed metal ball and the forcibly inserted region.

2. The prismatic battery according to claim 1, wherein the base plate is made of aluminum.

3. The prismatic battery according to claim 1, wherein the metal ball is made of aluminum.

4. A method for forming a prismatic battery, the method comprising:

mounting an electrode assembly in a prismatic battery case having a base plate;

forming an electrolyte injection hole having an inside upper end configured to have a downwardly tapering incline structure in the base plate;

providing a metal sphere having an initial radius in contact with the inside upper end of the electrolyte injection hole;

sealing the electrolyte injection hole by plastically deforming the metal sphere therewithin; and covering the forcibly inserted metal ball and electrolyte periphery with epoxy resin, wherein the downward taper incline structure has a width corresponding to 5% to 30% of the initial radius of the metal sphere and a depth corresponding to 10% to 25% of the initial radius of the metal sphere, and the downward taper structure is inclined downward at an angle of 20 to 70 degrees from a surface defining the upper end of the base plate.

5. A system for sealing a prismatic battery comprising:

a prismatic battery case;

an electrode assembly disposed within the prismatic battery case;

a base plate disposed on the prismatic battery case;

an electrolyte injection hole disposed in the base plate, the electrolyte injection hole having an inside upper end with a downwardly tapering incline structure; and a metal sphere having an initial radius disposed on the inside upper end of the electrolyte injection hole; and an epoxy resin is disposed on the plastically deformed metal ball and the forcibly inserted region, wherein the metal sphere is configured to be plastically deformed within the electrolyte injection hole and the downward taper incline structure has a width corresponding to 5% to 30% of the initial radius of the metal sphere and a depth corresponding to 10% to 25% of the initial radius of the metal sphere, and the downward taper incline structure is inclined downward at an angle of 20 to 70 degrees from a surface defining the upper end of the base plate.

6. The prismatic battery according to claim 1, wherein the plastically deformed metal ball and the electrolyte injection hole are shaped differently.

7. The prismatic battery of claim 1, wherein an interface between the plastically deformed metal ball contacts the electrolyte injection hole defines a forcibly inserted region.

8. The prismatic battery of claim 7, wherein the forcibly inserted region is welded.

9. The prismatic battery of claim 7, wherein the forcibly inserted region is laser welded.

* * * * *